United States Patent
Comat et al.

(10) Patent No.: US 11,987,226 B2
(45) Date of Patent: May 21, 2024

(54) METHOD FOR OPERATING AN AT LEAST SEMI-AUTOMATED MOBILE PLATFORM

(71) Applicant: Robert Bosch GmbH, Stuttgart (DE)

(72) Inventors: Guillaume Comat, Munich (DE); Thomas Brettschneider, Abstatt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 809 days.

(21) Appl. No.: 17/142,019

(22) Filed: Jan. 5, 2021

(65) Prior Publication Data
US 2021/0213921 A1 Jul. 15, 2021

(30) Foreign Application Priority Data
Jan. 10, 2020 (DE) .......................... 102020200278.9

(51) Int. Cl.
| | |
|---|---|
| *B60T 8/175* | (2006.01) |
| *B60K 28/16* | (2006.01) |
| *B60T 8/172* | (2006.01) |
| *B60T 8/1769* | (2006.01) |
| *B60W 40/10* | (2012.01) |

(52) U.S. Cl.
CPC .............. *B60T 8/175* (2013.01); *B60K 28/16* (2013.01); *B60T 8/1769* (2013.01)

(58) Field of Classification Search
None
See application file for complete search history.

(56) References Cited

U.S. PATENT DOCUMENTS

| | | | | |
|---|---|---|---|---|
| 4,643,485 | A * | 2/1987 | Leiber | .................. B60T 8/4809 303/145 |
| 2007/0027598 | A1* | 2/2007 | Mori | .................. B60W 10/184 701/41 |
| 2015/0127237 | A1* | 5/2015 | Blyth | .............. B60W 30/18172 701/70 |

FOREIGN PATENT DOCUMENTS

DE         3404018 C2    12/1992

\* cited by examiner

*Primary Examiner* — Aniss Chad
*Assistant Examiner* — Mahmoud M Kazimi
(74) *Attorney, Agent, or Firm* — NORTON ROSE FULBRIGHT US LLP; Gerard A. Messina

(57) ABSTRACT

A method for operating an at least semi-automated mobile platform which includes wheels, a braking system, and an acceleration sensor that generates acceleration values. The braking system, using a holding force, cooperates with the wheels in such a way that the platform is selectively fixed in a position. Each wheel includes a rotation angle sensor that generates a signal pulse based on a rotational position of the wheel. The method includes: reducing an initial holding force of the wheels, corresponding to an initial value of a control gradient; controlling the control gradient based on the acceleration values when the rotation angle sensor of a wheel has generated a first signal pulse; increasing the holding force of at least one of the wheels corresponding to a fixation gradient when the rotation angle sensor of a set of further wheels of the wheels has generated a signal pulse, to fix the platform.

11 Claims, 4 Drawing Sheets

METHOD FOR OPERATING AN AT LEAST SEMI-AUTOMATED MOBILE PLATFORM

CROSS REFERENCE

The present application claims the benefit under 35 U.S.C. § 119 of German Patent Application No. DE 102020200278.9 filed on Jan. 10, 2020, which is expressly incorporated herein by reference in its entirety.

BACKGROUND INFORMATION

In present motor vehicles or at least semi-automated mobile platforms, driving functions are increasingly being used which allow a semi-autonomous or fully autonomous driving operation via which the driver of the motor vehicle is to be relieved. Thus, for example, conventional parking assistants may carry out a parking operation semi-autonomously or fully autonomously.

Such functions frequently utilize planning and controller concepts which primarily use speed and acceleration signals as the basis, and which are ascertained, for example, with the aid of rotational speed sensors associated with the wheels. These types of rotational speed sensors generally deliver a predefined number of signal pulses for each revolution of a wheel, the signal pulses being uniformly distributed over the circumference of the wheel or over a full revolution of the wheel. The distance between two adjacent signal pulses on the wheel circumference is thus 1 cm to 5 cm, for example. This represents the smallest measurable distance for a traveling vehicle.

For driving functions in the range of low speeds, in particular for fully automated parking and maneuvering functions, it is difficult to derive the speed and/or acceleration signals from the rotational speed sensors with the necessary quality, since the number of detectable signal pulses is small. For example, if the travel speed is to be determined from the signal pulses of the rotational speed sensors, a reliable speed value is obtainable only after the distance covered is already so great that for a parking operation, for example, it would already be necessary to initiate a braking operation. This could result in overrunning the actual target point.

SUMMARY

It is advantageous to carry out only a single reproducible and fully automatic movement of a mobile platform for which the smallest controllable movement is executed by the platform. Such small movements may also define short distances by iterative execution.

The present invention provides a method for operating an at least semi-automated mobile platform, a method for controlling a mobile platform, a device, a computer program, and a machine-readable memory medium. Advantageous embodiments of the present invention are described herein.

In this entire description of the present invention, the sequence of method steps is presented in such a way that the method is easily understandable. However, those skilled in the art will recognize that many of the method steps may also be carried out in a different order, causing the same or a similar result. In this sense, the order of the method steps may be correspondingly changed. Some features are provided with numerals to improve the readability or to make the association more clear; however, this does not imply the presence of certain features.

The present invention is based on the finding that a gradual reduction in the brake force from a high to a low level assists with recognizing, for example with the aid of signal pulses of rotation angle sensors of various wheels, a small movement of the mobile platform in order to then immediately increase the brake force once again. A signal of an acceleration sensor may be used to increase the stability and accuracy of the movement.

According to one aspect of the present invention, a method for operating an at least semi-automated mobile platform on which an accelerating force acts is provided, and which includes at least a number of wheels, a braking system, and an acceleration sensor that generates acceleration values of the platform, the braking system with the aid of a holding force cooperating with at least the number of wheels in such a way that the platform is selectively fixed in a position, and the number of wheels in each case include a rotation angle sensor that generates a signal pulse as a function of a rotational position of the particular wheel. In accordance with an example embodiment of the present invention, in one step of the method, an initial holding force of the number of fixed wheels is reduced corresponding to an initial value of a control gradient. In a further step, the control gradient is controlled as a function of the acceleration values as soon as the rotation angle sensor of one of the wheels has generated a first signal pulse. In a further step, the holding force of at least one of the wheels is increased corresponding to a fixation gradient as soon as the particular rotation angle sensor of a set of further wheels of the number of wheels has generated a signal pulse, in order to fix the platform with the aid of at least the one wheel.

The accelerating force may be generated by a gravitational force, for example the downhill force, as well as by a drive system of the mobile platform.

The number of wheels on which the braking system acts, and that are equipped with a rotation angle sensor in each case, may be different, depending on the mobile platform and the way the method is used. In particular, this number may be one, two, three, four, or even a larger number of wheels.

The particular acceleration values of the acceleration sensor may be made up of at least two components, the first component being attributable to a gravitational force, and the second component being attributable to dynamic acceleration of the mobile platform. The control of the acceleration is carried out using the dynamic component.

At the start of the method, the mobile platform is fixed in a position via a sufficiently high holding force of the braking system. This sufficiently high holding force is typically applied to the braking system even after the method has ended, in order to fix the mobile platform in the new position.

Rotation angle sensors are typically used to determine speeds of mobile platforms, in which, for example, the number of signal pulses per unit time is determined. In this method, the individual signal pulses are evaluated in the method itself.

The number of signal pulses that must be detected or generated until the holding force is increased, using the fixation gradient, may be adapted to the requirements for reproducibility or robustness of the system, and may be, for example, two or three or four or a larger number of signal pulses.

A mobile platform may be understood to mean an at least semi-automated system that is mobile, and/or a driver assistance system of a vehicle. One possible example is an at least semi-automated vehicle or a vehicle that includes a driver assistance system. This means that in this regard, an at least semi-automated system encompasses a mobile platform with respect to an at least semi-automated functionality, but a mobile platform also encompasses vehicles and other mobile machines, including driver assistance systems. Other possible examples of mobile platforms are driver assistance systems that include multiple sensors, mobile multisensor robots such as robotic vacuum cleaners or lawn mowers, a multisensor monitoring system, a production machine, a personal assistant, a shuttle, a robotaxi, a ship, an aircraft, a commercial vehicle, or an access control system. Each of these systems may be a fully automated or semi-automated system.

Thus, by use of this example method, a particularly short distance may be reproducibly traveled with the mobile platform. In addition, provided the method may be iteratively carried out, a multiple of this particularly short distance may also be traveled.

According to one aspect of the present invention, it is provided that the control gradient is controlled as a function of a deviation of the acceleration value from an acceleration target value.

Due to this control of the acceleration value with the aid of the gradient of the holding force, an approximation of a minimum holding force is possible, which in particular allows the braking system to cooperate with the wheels in such a way that a minimum distance is covered due to the rotation of the wheels.

According to one aspect of the present invention, it is provided that the acceleration target value is a function of a plurality of signal pulses that have been generated by the particular rotation angle sensor of different wheels of the number of wheels.

An even more robust and reliable control is thus achieved, since the maximum allowable acceleration is further reduced. It is noted that in this approximation, the gradient may also become positive.

According to one aspect of the present invention, it is provided that the holding force is reduced from a starting holding force within two successive time intervals, each having different gradients of the holding force, in order to set the initial holding force of the braking system.

As a result, a conservative approximation of the holding force takes place in which a rotation of the wheels is possible.

According to one aspect of the present invention, it is provided that the gradient of the first of the two successive time intervals has a greater absolute value than the gradient of the second time interval.

As a result, the method may run more quickly due to the fact that the holding force is more rapidly reduced to a value that allows it to rotate the wheels.

This means that in order to speed up the method, the first two gradients are not controlled.

According to one aspect of the present invention, it is provided that the accelerating force that acts on the platform is a gravitational force or a force that is generated by a drive system of the platform.

According to one aspect of the present invention, it is provided that in one step, the method additionally provides a force that acts on the platform via a drive system of the platform before the initial holding force of the number of fixed wheels is reduced, in order to at least compensate for a gravitational force acting on the platform. In a further additional step, the force of the drive system is reduced as soon as the holding force, in the course of increasing the holding force that acts on at least one wheel, is sufficiently great to fix the platform at a position.

According to one aspect of the present invention, it is provided that one of the methods described above is iteratively executed until a desired distance has been covered with the platform. For this purpose, the step of increasing the holding force is modified in such a way that the holding force of at least the number of wheels is increased, corresponding to the fixation gradient, up to an intermediate holding force that is between a minimum holding force and a holding force, and that fixes the platform. The above-described method is subsequently continued with the step of reducing the initial holding force, the initial holding force during an iterative pass of the method being equal to the intermediate holding force.

Due to the iterative pass of the method, defined short distances that are a multiple of the shortest reproducible distance may be traveled.

According to one aspect of the present invention, it is provided that, based on an acceleration value, a control signal for controlling an at least semi-automated mobile platform is provided; and/or based on an acceleration value, a warning signal for warning an occupant of the at least semi-automated mobile platform is provided.

The term "based on," with regard to the feature that a control signal is provided based on an acceleration value, is understood in the broad sense. Thus, it is understood to mean that the acceleration value is used for any determination or computation of a control signal, which does not exclude the use of yet other input variables for this determination of the control signal. The same applies for the provision of a warning signal.

In accordance with an example embodiment of the present invention, a device is provided that is configured to carry out one of the methods described above. The method may be easily integrated into different systems by use of such a device.

In accordance with an example embodiment of the present invention, a computer program is provided that includes commands which prompt a computer to carry out one of the above-described methods when the program is executed by the computer. Such a computer program allows use of the described method in different systems.

In accordance with an example embodiment of the present invention, a machine-readable memory medium is provided on which the above-described computer program is stored.

BRIEF DESCRIPTION OF THE DRAWINGS

Exemplary embodiments of the present invention are explained in greater detail below with reference to FIGS. 1 through 4 and the following discussion.

DETAILED DESCRIPTION OF EXAMPLE EMBODIMENTS

Figure 1:
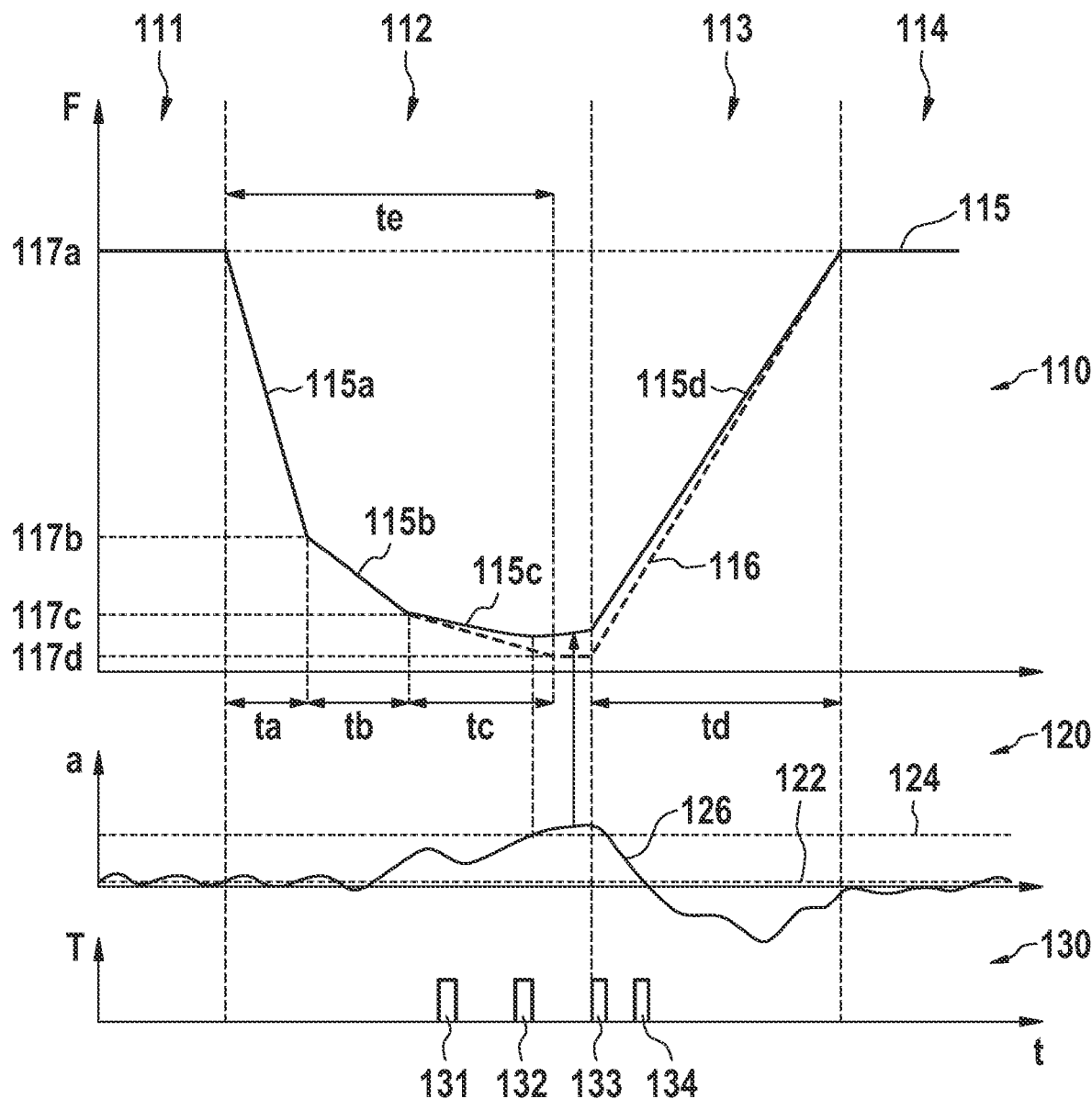
FIG. 1 shows time curves of retaining forces, accelerations, and signal pulses in one exemplary embodiment of the present invention.

FIG. 1 schematically depicts time curves of retaining forces 110, accelerations 120, and signal pulses 130 of rotation angle sensors in one exemplary embodiment of the method.

A request takes place in first time range 111 to execute an individual impact movement corresponding to described method 110. The accuracy with which this method may be executed is a function of the design of the rotation angle sensor (wheel speed sensor (WSS)), in particular via the number of sensors for the rotation angle. In this starting situation, acting holding force 117a of the braking system is considered to be strong enough to keep the vehicle or the mobile platform at a standstill, i.e., to fix it in a position, for example hydraulically. This holding force 117a may be referred to as a starting holding force, or according to another exemplary embodiment, as an initial holding force. This level 117a of the holding force of the braking system is referred to as a "high level," and according to the following discussion may be the basis for computing the other levels of holding forces 115 of method 110. Thus, in method 110 it is assumed that at the start of method 110, the mobile platform is fixed in a position due to a sufficient holding force 115 of the braking system, which cooperates with the wheels.

Alternatively, it is also possible at the start of method 110 to increase holding force 115 or the brake force to a holding force 115 that may be derived, for example, by taking into account a vehicle mass and a terrain uphill grade, for example by using an acceleration sensor.

In a time range 112 of the method, a reduction of holding force 115 is decreased with the aid of three different, essentially negative, gradients 115a, 115b, 115c until, for example, signal pulses 131, 132, 133, 134 from three different wheels are detected.

First gradient 115a passes from high level 117a to a mid-high level 117b of holding force 115 within a time interval ta. Second gradient 115b passes from mid-high level 117b to a mid-low level 117c of holding force 115 of the braking system within a time interval tb. Third gradient 115c is determined in such a way that it passes from mid-low level 117c to a low level 117d of holding force 115 within a time interval tc.

The gradients may be derived via the following formulas, for example, where $F_{Current}$ is the value of the current holding force:

$$G115a = \frac{(F_{MidHigh} - F_{High})}{ta}$$

$$G115b = \frac{(F_{MidLow} - F_{MidHigh})}{tb}$$

$$G115ca = \frac{(F_{Low} - F_{MidHigh})}{tc}$$

$$G4 = \frac{(F_{VeryHigh} - F_{Current})}{t4}$$

$$G6 = \frac{(F_{High} - F_{VeryHigh})}{t6}$$

First gradient 115a and second gradient 115b are constant. The value of control gradient 115c is continually recomputed according to the computed initial value for gradient 115c, i.e., the initial value of the control gradient, by a controller that obtains acceleration values 126 from an acceleration sensor. This is explained in greater detail below.

As soon as decreasing holding force 115 falls below mid-low level 117c, an acceleration control logic system that reduces third control gradient 115c as a function of acceleration values 126 of the acceleration sensor from an initial holding force, using an initial value for gradient 115c, may be activated.

This control of third gradient 115c, i.e., control gradient 115c, may take place from the point in time after which one of the rotation angle sensors of one of the wheels has generated a first signal pulse 131, 132, 133, 134.

When the wheels begin to move below mid-low level 117c of holding force 115 of the braking system, the position and speed of the vehicle are both equal to zero. In terms of physics, a distance d may be reached within time T when an acceleration a is constant, as follows:

$$a = \frac{2d}{T^2}$$

For example, a target value for an acceleration in this method may be:

$$a_{Tar} = 0.1 \text{ m/s}^2,$$

where d=0.0025 m and T=0.5 s.

It must be taken into account that a downhill acceleration additionally acts on the acceleration sensor as a function of a terrain in which the mobile platform is placed. This means that acceleration a 126 detected by the acceleration sensor is made up of a first term 122 that is a function of the uphill grade in the movement direction of the mobile platform, and a second term or absolute value that is a function of the dynamic movement of the mobile platform. This means that the acceleration contribution, which is a function of the terrain conditions, i.e., the uphill grade of the terrain in which the mobile platform is placed, may be taken into account corresponding to an offset value 122 for acceleration a 126, and determined, for example, in the rest state of the mobile platform.

This second term is to be controlled during the method for an acceleration a 126, corresponding to previously defined target value 124. Control gradient 115c is weighted by the ratio of the instantaneous dynamic acceleration changes divided by the setpoint acceleration, and controlled.

Alternatively, target value 124 for the acceleration may be adapted to the number of detected signal pulses 131, 132, 133, 134 from different wheels, so that in this method, target acceleration $A_{Tar}$ 124, also referred to as the acceleration target value, is reduced according to the following formulas, where $W_{curr}$ is the number of signal pulses detected up to that point, which is normalized with a number $W_{Ticks}$ of possible signal pulses:

$$A_{Tar} = \frac{2d}{tc^2}\left(1 - \frac{W_{curr}}{W_{Ticks}}\right)$$

$$G115c = G115_{Initial}\left(1 - \frac{A_{curr} - (A_{start} - A_{Uphill\,grade})}{A_{Tar}}\right)$$

where $A_{curr}$ is currently measured acceleration 126, $A_{start}$ is acceleration 126 at the start of the method, and $A_{Uphill\ grade}$ is the downhill acceleration acting in the travel direction due to gravity.

Thus, during method 110, holding force 115 is adapted as a function of number $W_{curr}$ of previously detected signal pulses 131, 132, 133, 134 of different wheels in such a way that target value A Tar 124 of the acceleration of the mobile platform decreases in this method 110. For this purpose, method 110 may, for example, further increase holding force 115 until a defined number of signal pulses 131, 132, 133, 134 has been detected.

For example, number $W_{Ticks}$ may be equal to four signal pulses 131, 132, 133, 134, and a time T for target value A Tar 124 of the acceleration may be set equal to tc, for example.

As soon as a third signal pulse 131, 132, 133, 134, for example, is detected, method 110 may be configured to increase holding force 115 using a fourth gradient 115d, which may also be referred to as a fixation gradient, in order to once again fix the platform with the aid of at least one wheel. The increase in holding force 115 using fourth gradient 115d may be maintained until initial high level 117a is once again reached. The mobile platform is thus fixed once again, corresponding to the original state, after method 110 ends.

Figure 2:
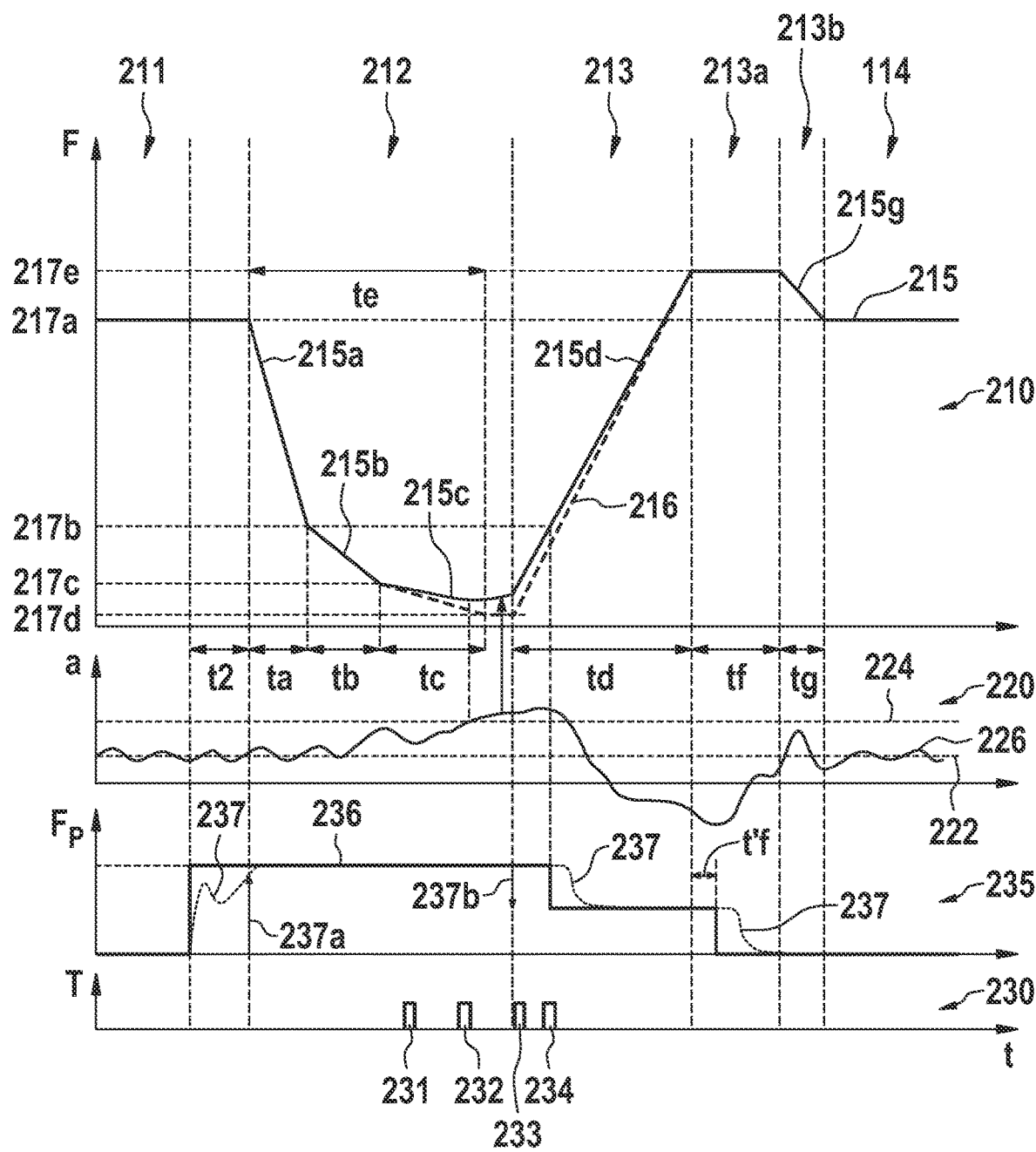
FIG. 2 shows time curves of retaining forces, accelerations, forces on the platform, and signal pulses in a further exemplary embodiment of the present invention.

FIG. 2 also schematically depicts time curves of holding forces 215, accelerations 226, and signal pulses 231, 232, 233, 234 in a further exemplary embodiment of method 210, forces 236 generated by a drive unit of the mobile platform additionally being exerted on the platform.

In a first time interval 211, a request is generated to carry out an individual impact movement corresponding to the method described above.

The starting situation corresponding to the exemplary embodiment in FIG. 1, and thus holding force 215 of the braking system, is at a high level 217a.

In addition, in this exemplary embodiment 210, for example due to an uphill grade that is opposite a planned movement direction of the mobile platform, during a preparation step 211 a drive system of the mobile platform requests a counterforce 236 that acts on at least one of the wheels and is built up in a time interval t2 corresponding to curve 237.

A setpoint value for this counterforce 236 is a function of the vehicle mass and the inclination of the terrain opposite the movement direction of the mobile platform.

This step of building up counterforce 236 is to be built up within time interval t2; however, upon reaching a certain percentage of target value 237, for example 90%, the next step of the method may be enabled.

In subsequent time interval 212, in which holding force 215 is reduced using three different gradients 215a through 215c, the method corresponds to that described for FIG. 1.

During increase 216 of holding force 215 after detection of third signal pulse 231, 232, 233, 234 using positive gradient 215d, which starts from an instantaneous level of holding force 215, counterforce 236 of the drive unit is reduced by one-half, for example, upon reaching or exceeding mid-high level 217b. For safety reasons, holding force 215 may be further increased to a very high level, using positive gradient 215d, in order to securely prevent the mobile platform from rolling backwards, for example in a terrain having a steep uphill grade. Holding force 215 of the braking system may once again be reduced to high level 217a, for example using gradient 215g, only when counterforce 236 has been reduced to a very low value in a time range tf. Time t'f should be less than tf, so that when the method is carried out corresponding to this exemplary embodiment, the mobile platform is once again fixed in a new position.

Figure 3:
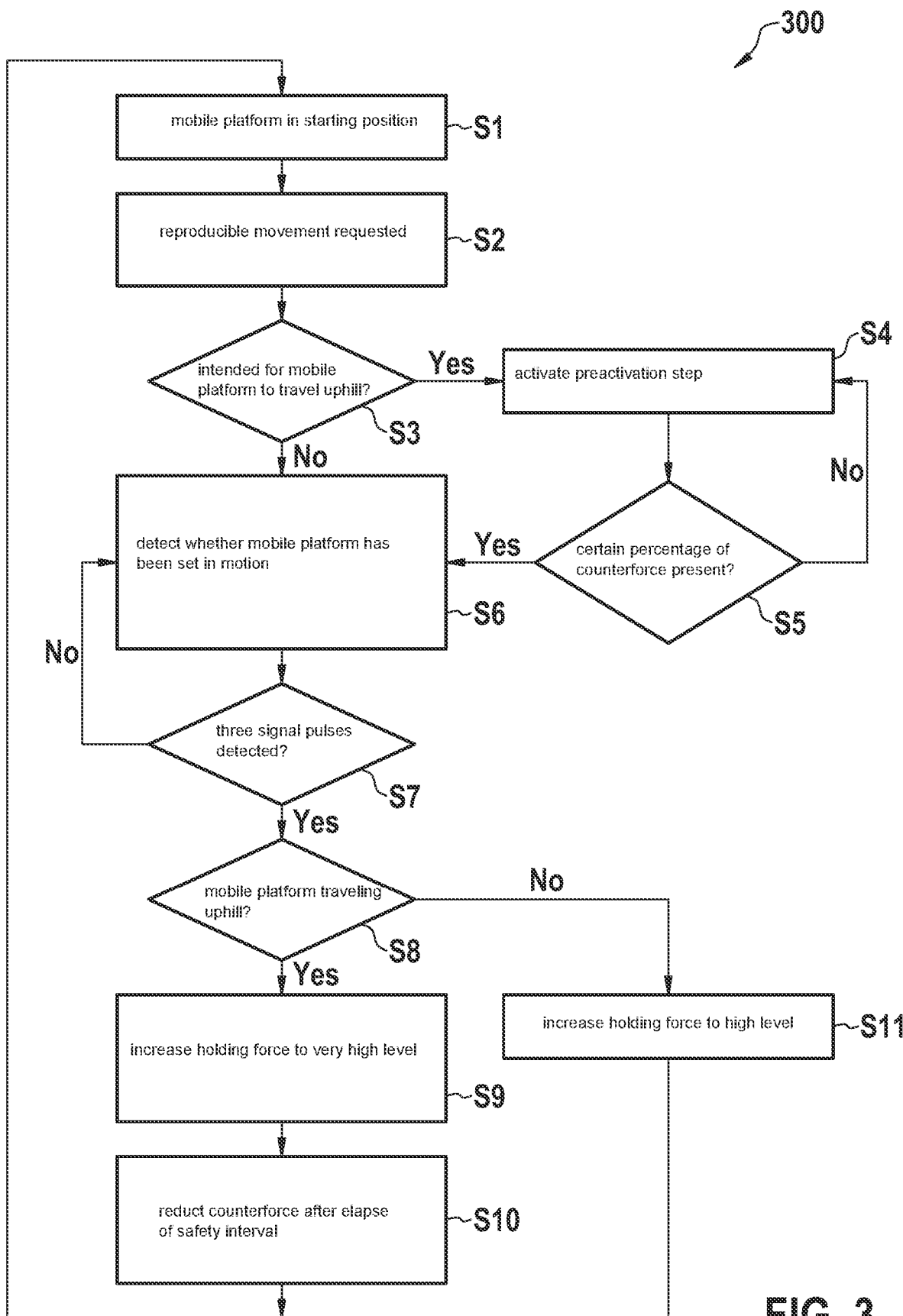
FIG. 3 shows a data flowchart of the method, in accordance with an example embodiment of the present invention.

FIG. 3 schematically depicts a flowchart of one exemplary embodiment of method 110, 210, 410. The mobile platform is in a starting situation in a step S1. The mobile platform is fixed in its position with a high level of holding force 115, 215, 415.

The method is requested to be carried out in a step S2, namely, a single reproducible movement of the mobile platform with a smallest determinable distance d that is in particular a function of the accuracy of the rotation angle sensors used.

A check is made in step S3 as to whether it is intended for the mobile platform to travel uphill. If this is intended, in a preactivation step (S4) the drive unit is activated to provide a counterforce 236 that is a function of the uphill grade and the mass of the mobile platform.

Before the method is further carried out, a check is made in step S5 as to whether a certain percentage, for example 90%, of the requested counterforce is present at the wheels, or whether a certain time interval has elapsed. If step S5 has been fulfilled, or if the mobile platform is not intended to travel uphill, step S6 follows, in which it is detected whether the mobile platform has been set in motion. For this purpose, holding force 115, 215, 415 of the braking system, which acts on a number of wheels, is reduced from a high level to a mid-high level in a first time interval, and is reduced from the mid-high level to a mid-low level in a further time interval, and is reduced from the mid-low level to a low level in a further step in a further time interval, and an acceleration control logic system is activated.

A check is made in a step S7, and it is awaited whether three signal pulses 131, 132, 133, 134 from different wheels have been detected. As soon as the three signal pulses 131, 132, 133, 134 have been detected, a query (S8) may take place concerning whether the mobile platform is traveling uphill. In the event that the mobile platform is traveling uphill, a first method step S9 for preventing the mobile platform from rolling backwards is carried out. For this purpose, the holding force is increased to a very high level of the holding force, using a positive gradient, and during this increase, counterforce 236 is reduced, for example, to half its value as soon as the holding force is greater than the mid-high level. Method step S9 is followed by a further method step S10, in which after a safety interval has elapsed, the counterforce is reduced from the very high level to a high level, since this counterforce is no longer needed.

If the mobile platform is not traveling uphill, step S8 is followed by step S11, in which the holding force is increased only to the high level.

Step S1 may subsequently follow step S10 as well as step S11 in an iterative pass of the method.

Figure 4:
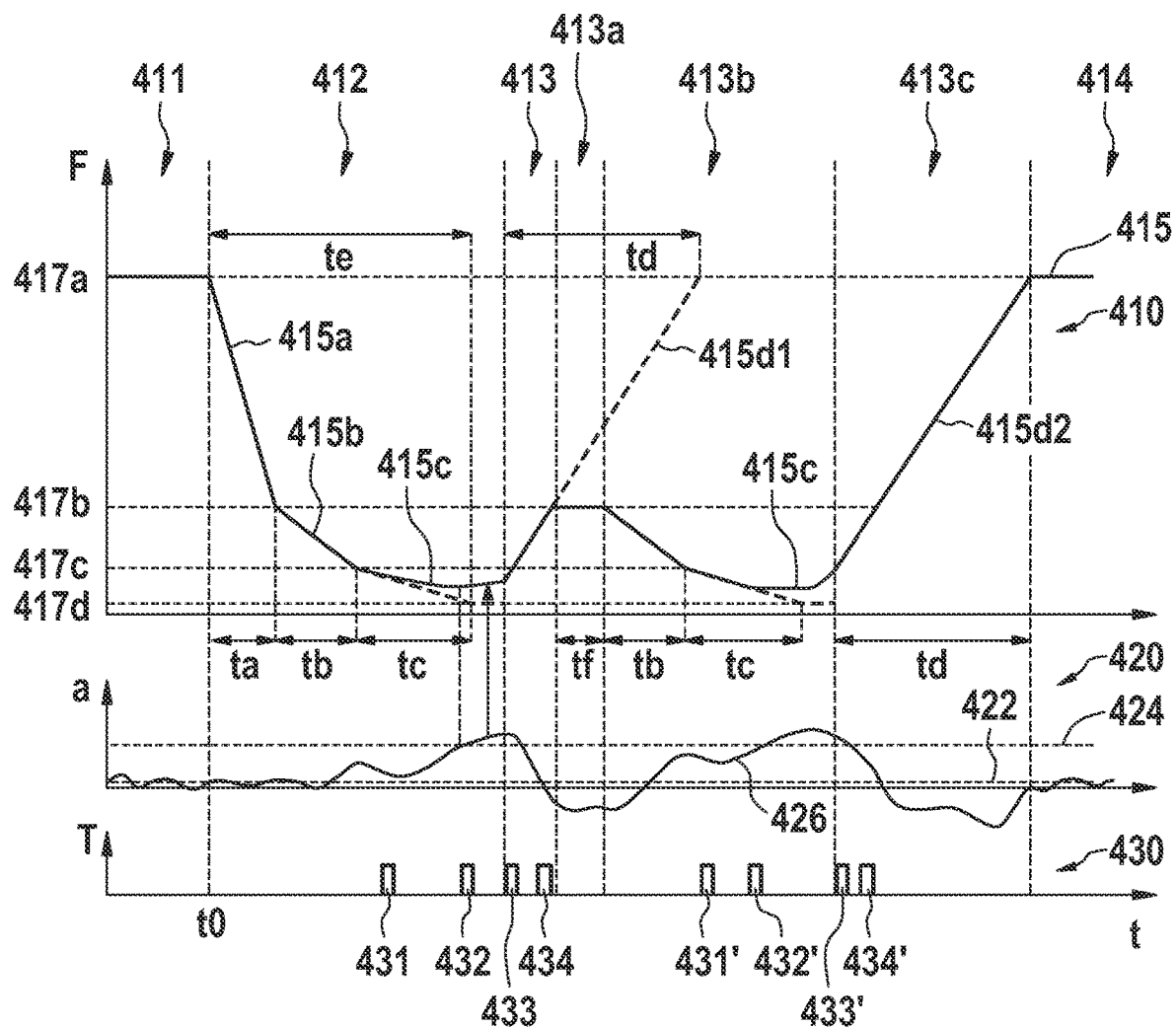
FIG. 4 shows time curves of retaining forces, accelerations, forces on the platform, and signal pulses in one exemplary embodiment that is followed by a further method sequence, corresponding to an iterative pass of the method, in accordance with the present invention.

FIG. 4 schematically depicts time curves of holding forces 415, accelerations 426, and signal pulses 431, 432, 433, 434 in a further exemplary embodiment of method 410 in which a further method sequence is correspondingly followed by an iterative pass of the method. With such a multiple iterative pass of the method steps of the method, a corresponding multiple distance nd of smallest determinable distance d may be traveled by the mobile platform.

In other words, a so-called "crawl mode" may be executed which carries out the doubled "nudge" movement.

The starting situation of the mobile platform and the method steps up to detecting the third signal pulse remain unchanged.

After three signal pulses 431, 432, 433, 434 have been detected by three different wheels, holding force 415 is increased from the instantaneous brake force level to mid-high level 417b. The mobile platform is then considered to be at a standstill, and may be held at the same level of holding force 415 in order to return acceleration 426 to its initial value.

This is then followed once again by a method step of gradual reduction 413b which, however, starts from mid-high level 417b. Holding force 415 of the braking system is reduced, using second gradient 415b, and is then determined by third gradient 415c with the aid of the acceleration control logic system.

An n−1-fold execution of this internal sequence of the method steps, which starts from mid-high level 417b, ensures the travel of an n-fold shortest distance d, which is ended in that in the last step, the holding force is increased to end the maneuver by increasing the brake force to the high level.

Typical values of the variables of methods 110, 210, 300, 410:

| Variable | Wide range | Narrow range |
| --- | --- | --- |
| FHigh | [500; 30,000] N | [2000; 10,000] N |
| FVeryHigh | [100; 150] % of FHigh | [100; 130] % of FHigh |
| FMidHigh | [20; 80] % of FHigh | [35; 65] % of FHigh |
| FMidLow | [10; 50] % of FHigh | [10; 35] % of FHigh |
| Flow | [0; 25] % of FHigh | [0; 10] % of FxHigh |
| ta | [0; 3] s | [0.2; 1] s |
| te | [0,1; 5] s | [0.8; 1.8] s |
| ta | [10; 40] % of te | [10; 30] % of te |
| tb | [10; 60] % of te | [15; 40] % of te |
| tc | [10; 80] % of te | [20; 60] % of te |
| td | [0.05; 2] s | [0.2; 0.8] s |
| tf | [0; 2] s | [0.2; 0.6] s |
| t'f | [0; 50] % of tf | [0; 35] % of tf |
| tg | [0,05; 1] s | [0; 0.5] s |
| G115a | [−40, 000; −3000] N/s | [−20, 000; −6000] N/s |
| G115b | [−5000; −3000] N/s | [−4500; −3500] N/s |
| G115c | [−5000; −2000] N/s | [−2500; −1000] N/s |
| G115d | [5000; 20,000] N/s | [10,000; 15,000] N/s |
| G215g | [−15,000; 0] N/s | [−6000; 0] N/s |
| FPmax | [30; 5000] Nm | [50; 2000] Nm |

What is claimed is:

1. A method for operating an at least semi-automated mobile platform on which an accelerating force acts, the mobile platform including at least a number of wheels, a braking system, and an acceleration sensor that generates acceleration values of the platform, the braking system, using a holding force, being configured to cooperate with at least the number of wheels in such a way that the platform is selectively fixed in a position, and wherein each wheel of the number of wheels includes a respective rotation angle sensor that generates a signal pulse as a function of a rotational position of the wheel, the method comprising the following steps:
performing a fixed gradient reduction in a fixed gradient reduction period at a start of which a reduction of a holding force at a combination of the number of fixed wheels is begun, wherein the fixed gradient reduction includes one or more holding force reductions that are each at a respective predefined fixed gradient;
as soon as the respective rotation angle sensor of any single one of the wheels has generated a first signal pulse, switching from the fixed gradient reduction period into a dynamic gradient reduction period in which a continued reduction of the holding force is performed using a controlled gradient that is modified during the dynamic gradient reduction period according to at least one variable determined during the dynamic gradient reduction period; and
switching from the dynamic gradient reduction period into a fixed gradient increase period during which the holding force of at least one of the wheels is increased and at a start of which the holding force of at least one of the wheels begins to be increased with a fixed gradient increase, the switching being performed in response to a predefined number of signal pulses has been generated by combination of the respective rotation angle sensors of all of the number of wheels, thereby fixing the platform using the at least one of the wheels.

2. The method as recited in claim 1, wherein the modification of the controlled gradient during the dynamic gradient reduction period is performed as a function of a deviation of an acceleration value of the acceleration values from an acceleration target value.

3. The method as recited in claim 2, wherein the acceleration target value is a function of a plurality of signal pulses that have been generated by the respective rotation angle sensor of different wheels of the number of wheels.

4. The method as recited in claim 1, wherein the one or more holding force reductions includes a first holding force reduction from a starting holding force at a first one of the respective predefined fixed gradients followed by a second holding force reduction at a second one of respective predefined fixed gradients.

5. The method as recited in claim 4, wherein the first one of the respective predefined fixed gradients has a greater absolute value than the second one of the respective predefined fixed gradients.

6. The method as recited in claim 1, wherein the accelerating force that acts on the platform is a gravitational force or a force that is generated by a drive system of the platform.

7. The method as recited in claim 1, further comprising the following steps:
providing a force that acts on the platform via a drive system of the platform before an initial holding force of the number of fixed wheels is reduced in the dynamic gradient reduction period to at least compensate for a gravitational force acting on the platform; and
reducing the force of the drive system as soon as the holding force, in the course of increasing the holding force that acts on the at least one of the wheels, is sufficiently great to fix the platform at a position.

8. The method as recited in claim 1, wherein the method is iteratively executed until a desired distance has been covered with the platform, in that the increase of the holding force in the fixed gradient increase period is modified in such a way that the holding force of at least the number of wheels is increased, corresponding to the fixed gradient, up to an intermediate holding force that is between a minimum holding force and a value of the holding force at the beginning of the fixed gradient reduction period and that fixes the platform before the method is continued with another dynamic gradient reduction period beginning with a reduction from the intermediate holding force.

9. The method as recited in claim 1, wherein: (i) based on an acceleration value of the acceleration values, a control signal for controlling an at least semi-automated vehicle is provided, and/or (ii) based on the acceleration value, a warning signal for warning a vehicle occupant is provided.

10. A device configured to operate an at least semi-automated mobile platform on which an accelerating force acts, the mobile platform including at least a number of wheels, a braking system, and an acceleration sensor that generates acceleration values of the platform, the braking system, using a holding force, being configured to cooperate with at least the number of wheels in such a way that the platform is selectively fixed in a position, and wherein each wheel of the number of wheels includes a respective rotation angle sensor that generates a signal pulse as a function of a rotational position of the wheel, the device configured to:
- perform a fixed gradient reduction in a fixed gradient reduction period at a start of which a reduction of a holding force at a combination of the number of fixed wheels is begun, wherein the fixed gradient reduction includes one or more holding force reductions that are each at a respective predefined fixed gradient;
- as soon as the respective rotation angle sensor of any single one of the wheels has generated a first signal pulse, switch from the fixed gradient reduction period into a dynamic gradient reduction period in which a continued reduction of the holding force is performed using a controlled gradient that is modified during the dynamic gradient reduction period according to at least one variable determined during the dynamic gradient reduction period; and
- switch from the dynamic gradient reduction period into a fixed gradient increase period during which the holding force of at least one of the wheels is increased and at a start of which the holding force of at least one of the wheels begins to be increased with a fixed gradient increase, the switching being performed in response to a predefined number of signal pulses has been generated by combination of the respective rotation angle sensors of all of the number of wheels, thereby fixing the platform using the at least one of the wheels.

11. A non-transitory machine-readable memory medium on which is stored a computer program for operating an at least semi-automated mobile platform on which an accelerating force acts, the mobile platform including at least a number of wheels, a braking system, and an acceleration sensor that generates acceleration values of the platform, the braking system, using a holding force, being configured to cooperate with at least the number of wheels in such a way that the platform is selectively fixed in a position, and wherein each wheel of the number of wheels includes a respective rotation angle sensor that generates a signal pulse as a function of a rotational position of the wheel, the computer program, when executed by a computer, causing the computer to perform the following steps:
- performing a fixed gradient reduction in a fixed gradient reduction period at a start of which a reduction of a holding force at a combination of the number of fixed wheels is begun, wherein the fixed gradient reduction includes one or more holding force reductions that are each at a respective predefined fixed gradient;
- as soon as the respective rotation angle sensor of any single one of the wheels has generated a first signal pulse, switching from the fixed gradient reduction period into a dynamic gradient reduction period in which a continued reduction of the holding force is performed using a controlled gradient that is modified during the dynamic gradient reduction period according to at least one variable determined during the dynamic gradient reduction period; and
- switching from the dynamic gradient reduction period into a fixed gradient increase period during which the holding force of at least one of the wheels is increased and at a start of which the holding force of at least one of the wheels begins to be increased with a fixed gradient increase, the switching being performed in response to a predefined number of signal pulses has been generated by combination of the respective rotation angle sensors of all of the number of wheels, thereby fixing the platform using the at least one of the wheels.

* * * * *